(12) United States Patent
Mandal (10) Patent No.: US 9,664,034 B2
(45) Date of Patent: May 30, 2017

(54) ACOUSTIC TRANSDUCER APPARATUS, SYSTEMS, AND METHODS

(75) Inventor: Batakrishna Mandal, Missouri City, TX (US)

(73) Assignee: Halliburton Energy Services, Inc., Houston, TX (US)

(*) Notice: Subject to any disclaimer, the term of this patent is extended or adjusted under 35 U.S.C. 154(b) by 187 days.

(21) Appl. No.: 14/350,640

(22) PCT Filed: Nov. 30, 2011

(86) PCT No.: PCT/US2011/062692
§ 371 (c)(1),
(2), (4) Date: Apr. 9, 2014

(87) PCT Pub. No.: WO2013/081608
PCT Pub. Date: Jun. 6, 2013

(65) Prior Publication Data
US 2014/0301164 A1    Oct. 9, 2014

(51) Int. Cl.
G01V 1/52 (2006.01)
E21B 47/10 (2012.01)
G01V 1/44 (2006.01)
E21B 49/00 (2006.01)
G01H 5/00 (2006.01)

(52) U.S. Cl.
CPC ............ *E21B 47/101* (2013.01); *E21B 49/00* (2013.01); *G01H 5/00* (2013.01); *G01V 1/44* (2013.01); *G01V 1/52* (2013.01); *G01V 2001/526* (2013.01)

(58) Field of Classification Search
CPC ......... E21B 49/00; E21B 47/101; G01V 1/52; G01V 1/44; G01V 2001/526; G01H 5/00

USPC .......................................................... 367/35
See application file for complete search history.

(56) References Cited

U.S. PATENT DOCUMENTS

| 5,341,345 A | 8/1994 | Warner et al. |
|---|---|---|
| 5,763,773 A | 6/1998 | Birchak et al. |
| 5,841,734 A | 11/1998 | Ritter et al. |

(Continued)

FOREIGN PATENT DOCUMENTS

WO    WO-2013081608 A1    6/2013

OTHER PUBLICATIONS

"Australian Application Serial No. 2011382521, Examination Report No. 1 mailed Jun. 26, 2014", 3 pgs.

(Continued)

*Primary Examiner* — Daniel L Murphy
(74) *Attorney, Agent, or Firm* — Gilliam IP PLLC (57) ABSTRACT

In some embodiments, apparatus and systems, as well as method and articles, may operate to launch acoustic waves along a first acoustic path length from an acoustic transducer toward an axis of rotation, to impinge on a first front surface of a target substantially fixed with respect to the axis, and to receive a reflection of the acoustic waves from the first front surface at the acoustic transducer. After rotating the acoustic transducer about the axis along a substantially circular path, additional activities may include launching acoustic waves along a second acoustic path length, different from the first acoustic path length, from the acoustic transducer toward the axis to impinge on a second front surface of the target, and receiving a reflection of the acoustic waves from the second front surface at the acoustic transducer. Additional apparatus, systems, and methods are disclosed.

20 Claims, 7 Drawing Sheets

(56) References Cited

U.S. PATENT DOCUMENTS

| | | | |
|---|---|---|---|
| 6,098,017 | A | 8/2000 | Brown et al. |
| 6,125,079 | A | 9/2000 | Birchak et al. |
| 7,522,471 | B2 | 4/2009 | Froelich et al. |
| 7,975,541 | B2 | 7/2011 | Large et al. |
| 2004/0095847 | A1 | 5/2004 | Hassan et al. |
| 2006/0067162 | A1 | 3/2006 | Blankinship et al. |
| 2006/0262643 | A1 | 11/2006 | Blankinship et al. |
| 2008/0186805 | A1 | 8/2008 | Han |
| 2009/0173150 | A1 | 7/2009 | Difoggio |
| 2009/0201764 | A1 | 8/2009 | Liu |
| 2011/0096629 | A1 | 4/2011 | Raphael |

OTHER PUBLICATIONS

"European Application Serial No. 11876518.9, Office Action mailed Jul. 8, 2014", 3 pgs.

"European Application Serial No. 11876518.9, Response filed Sep. 26, 2014 to Office Action mailed Jul. 8, 2014", 9 pgs.

"Australian Application Serial No. 2011382521, Response filed Oct. 7, 2014 to Examination Report mailed Jun. 26, 2014", 3 pgs.

"Canadian Application Serial No. 2,856,358, Office Action mailed Aug. 11, 2015", 4 pgs.

"International Application Serial No. PCT/US2011/062692, Int Search Report mailed Feb. 23, 2012", 2 pgs.

"International Application Serial No. PCT/US2011/062692, International Preliminary Report on Patentability mailed Feb. 25, 2014", 10 pgs.

"International Application Serial No. PCT/US2011/062692, Written Opinion mailed Feb. 23, 2012", 9 pgs.

Zeroug, S., et al., "Ultrasonic Leaky-Lamb Wave Imaging Through a Highly Contrasting Layer", 2003 IEEE Ultrasonic Symposium, (2003), 794-798.

"European Application Serial No. 11876518.9, Extended European Search Report mailed Oct. 22, 2015", 7 pgs.

"International Application Serial No. PCT/US2011/062692, Response filed Aug. 20, 2013 to Written Opinion mailed Feb. 23, 2012", 8 pgs.

Zeroug, S., et al., "Ultrasonic Leaky-Lamb Wave Imaging Through a Highly Contrasting Layer", *2003 IEEE Ultrasonic Symposium-794*, (2003), 794-798.

ACOUSTIC TRANSDUCER APPARATUS, SYSTEMS, AND METHODS

PRIORITY APPLICATION

This application is a U.S. National Stage Filing under 35 U.S.C. 371 from International Application Number PCT/US2011/062692, filed on 30 Nov. 2011, and published as WO 2013/081608 A1 on 6 Jun. 2013; which application and publication are incorporated herein by reference in its entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, logging tools of the acoustic type are often used to provide information that is directly related to geo-mechanical properties.

Traditional acoustic tools utilize transmitters to create pressure waves inside the borehole fluid, which in turn create several types of waveguide modes in the borehole. Corresponding modes of propagation occur in the formation surrounding the borehole, and each of these can be used to provide information about formation properties. Thus, data associated with the various modes can be acquired and processed to determine formation properties, such as compression and shear wave velocity in the formation. For this reason, acoustic tools are an integral part of modern geophysical surveys, providing information on the mechanical properties of the medium by measuring acoustic modes of propagation.

When using conventional acoustic tools, at least two difficulties arise. First, the velocity of sound in the fluid surrounding the tool may vary, causing errors in a variety of distance (e.g., caliper) measurements. Second, reflector signals provided by the interface behind the casing are often troublesome to separate from other signals, so that the location of the interface itself is poorly defined.

DETAILED DESCRIPTION

Imaging through wellbore casing is a challenging problem, the solution of which is useful to provide cement evaluation, and to prevent leaks. Some CAST (circumferential acoustic scanning tool) systems with pulse-echo devices currently provide some degree of inspection with respect to the integrity of the casing, and the cement adjacent to the casing. However, the cement/formation boundary and the interface behind the casing remain ill-defined in many instances.

This is because, even though perpendicular reflectors behind the casing can be detected using pulse-echo devices, it is difficult to separate the casing reverberation signal from signals of interest due to reflected signal strengths that originate from the interface behind the casing. If the interface is not normal to the incident waveform, then recovering reflected signals is extremely difficult when a pulse-echo device is used. Therefore, a different type of ultrasonic imaging tool is needed to image thorough the casing, to define the interface behind the casing.

To address some of the challenges described above, as well as others, apparatus, systems, and methods for acquiring acoustic waveform information with a unique arrangement of one or more acoustic sensors are described. Various embodiments include a single transducer that operates along different acoustic path lengths, and in some embodiments, an array of pitch-catch transducers. This mechanism helps determine fluid properties with greater accuracy, and can improve imaging ability. Various example embodiments that can provide some or all of these advantages will now be described in detail.

Figure 1:
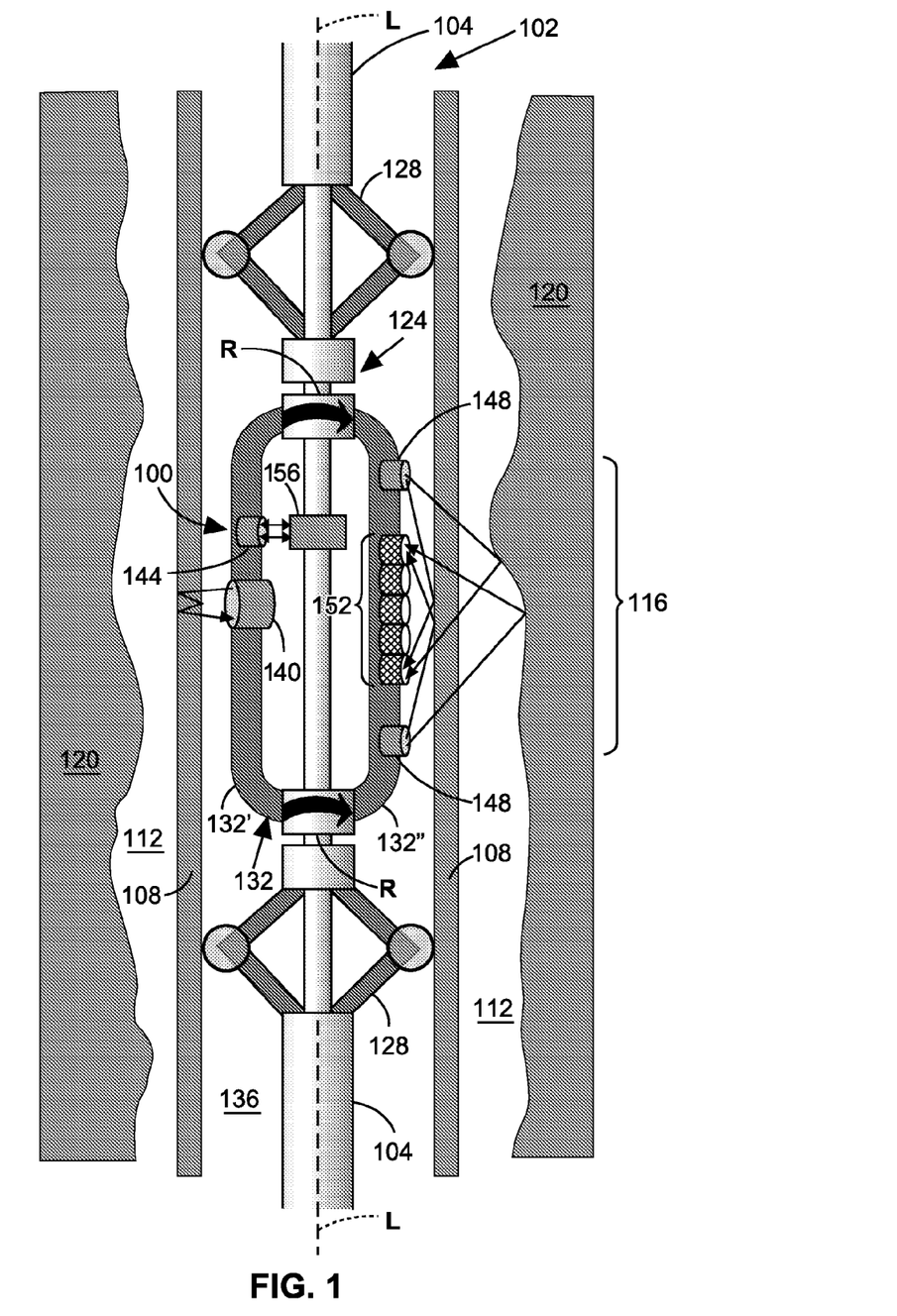
FIG. 1 is a side view of an apparatus and a down hole tool according to various embodiments of the invention.

FIG. 1 is a side view of an apparatus 100 and down hole tool 102 according to various embodiments of the invention. The down hole tool 102 may comprise a an ultrasonic tool with a housing 104 coupled to a rotatable mount 124 for imaging behind casing 108 and evaluation of cement 112 condition. The rotatable mount 124 is attached in turn to a pulse-echo device 140 (e.g., a pulse-echo CAST transducer), and a pitch/catch array 116, which includes two transmitters 148 and five receivers 152.

The rotatable mount 124 is also attached to the apparatus 100, which comprises another pulse-echo device 144 (e.g., a second pulse-echo transducer) for velocity measurement in a fluid 136 (e.g., mud), and a dual-faced target 156 that provides at least two different propagation distances through the fluid 136, which can be averaged to provide a better measurement of the fluid velocity.

The pitch/catch array 116 is used to image behind the casing 108. The array 116 helps to minimize unwanted noise (internal reverberation) and to enhance the second interface signal provided by the interface between the cement 112 and the formation 120, when acoustic waveforms are transmitted and received.

For the purposes of this document, an "acoustic" waveform means a waveform that provides a record of energy in a band of frequencies that extends from about 20 Hz to about 20 MHz. Acoustic transducers are configured to emit and/or receive waves that have the greater portion of their energy contained within this band of frequencies.

The array 116 might be about one meter in length, including transmitters 148 and receivers 152, along the length of the axis of rotation L, which is substantially aligned with the longitudinal axis of the housing 104. The pitch/catch arrangement of the array 116 should provide better imaging than prior art devices. The rotatable mount 124 (e.g., an in-line rotatable head) is shown with in-line centralizers 128, which allows the rotatable mount 124 to be located at any point in a logging tool string. One or more inline centralizers 128 may be disposed between the housing 104 and the rotatable mount 124. The rotatable mount 124 can comprise a framework 132 having two or more arms (two arms are shown—a first arm 132' and a second arm 132") approximately horizontally opposed across the longitudinal axis of the housing 104. The pulse-echo devices 140, 144 may be attached to the first arm 132', and the array 116 may be attached to the second arm 132".

The weight of the individual arms 132', 132" may be adjusted to balance the weight of various components (e.g., transducers, such as the array 116) attached to the arms 132', 132", to impart rotational stability to the rotatable mount 124. The arms 132', 132" may be provided with a fluid dynamic profile design to reduce drag in the borehole fluid 136 while rotating. The framework 132 may permit radial expansion and contraction, to operate more easily in different sizes of the borehole.

By using the array 116, cement evaluation with imaging behind the casing 108 may be accomplished more easily. Both pitch/catch (e.g., in the array 116) and pulse-echo devices 140 (e.g., a pulse-echo transducer) can be used to assess the integrity of the cement 112 behind the casing 108. For example, the pulse-echo device 140 can be used to estimate the thickness of the casing 108, the borehole shape, and the impedance of the cement 112 behind the casing 108 (from the normal incidence of the ultrasonic wave). The pitch/catch array 116 can be used to help identify reflectors behind the casing 108 as part of imaging behind the casing 108, including reflectors that are not normal to the incidence wave provided by the pulse-echo device 140.

The arrangement of two transmitters 148 and five receivers 152 in the array 116 provides relatively high resolution and compensated measurements. In some embodiments, the receivers 152 are attached to the framework 132 (e.g., to the arm 132") so as to span a distance of about one-third of a meter, where each end of the receiver group is located about one-third of a meter from a respective transmitter 148, assuming that the distance from one transmitter 148 to the other is about one meter. Other arrangements are possible, including maintaining approximately the same distance ratios between the transmitters 148 and the array 116 (e.g., if the distance between transmitters 148 is considered to be a unit distance, the receiver array 116 spans about one third of that distance, with the ends of the array 116 located approximately equally between the two transmitters 148). The array 116 is useful to analyze small signals arriving from reflectors behind the casing 108, serving to enhance the received signal-to-noise ratio.

To further enhance the reflected signals, the transmitters 148 and/or receivers 152 may be tilted toward each other. For example, the transmitters 148 may be tilted away from the horizontal direction, toward the receivers 152, at an angle that is greater than the P-S (pressure-shear wave) critical angle, which is about 28° in some embodiments. Tilting the transmitters 148 in this way can to enhance the signal received from the interface between the cement 112 and the formation 120 behind the casing 108.

Array focusing may be used to even further enhance the received signals. In some embodiments, the transmitters 148 operate with a center frequency of about 50 kHz to about 150 kHz, or a broad band (impulse or chirp) pulse from about 50 kHz to about 200 kHz. The response of the receivers 152 may be selected to peak over a wider range, of about 20 kHz to about 250 kHz.

While a rotatable mount 124 is shown, the pitch/catch concept can also be applied to a non-rotating segmented transducer array assembly to image behind casing. In this case, a non-rotating array of receivers 152 with five azimuthal segments can map the interface between the cement 112 and the formation 120, although perhaps with less resolution than the rotatable mount 124 provides.

Figure 2:
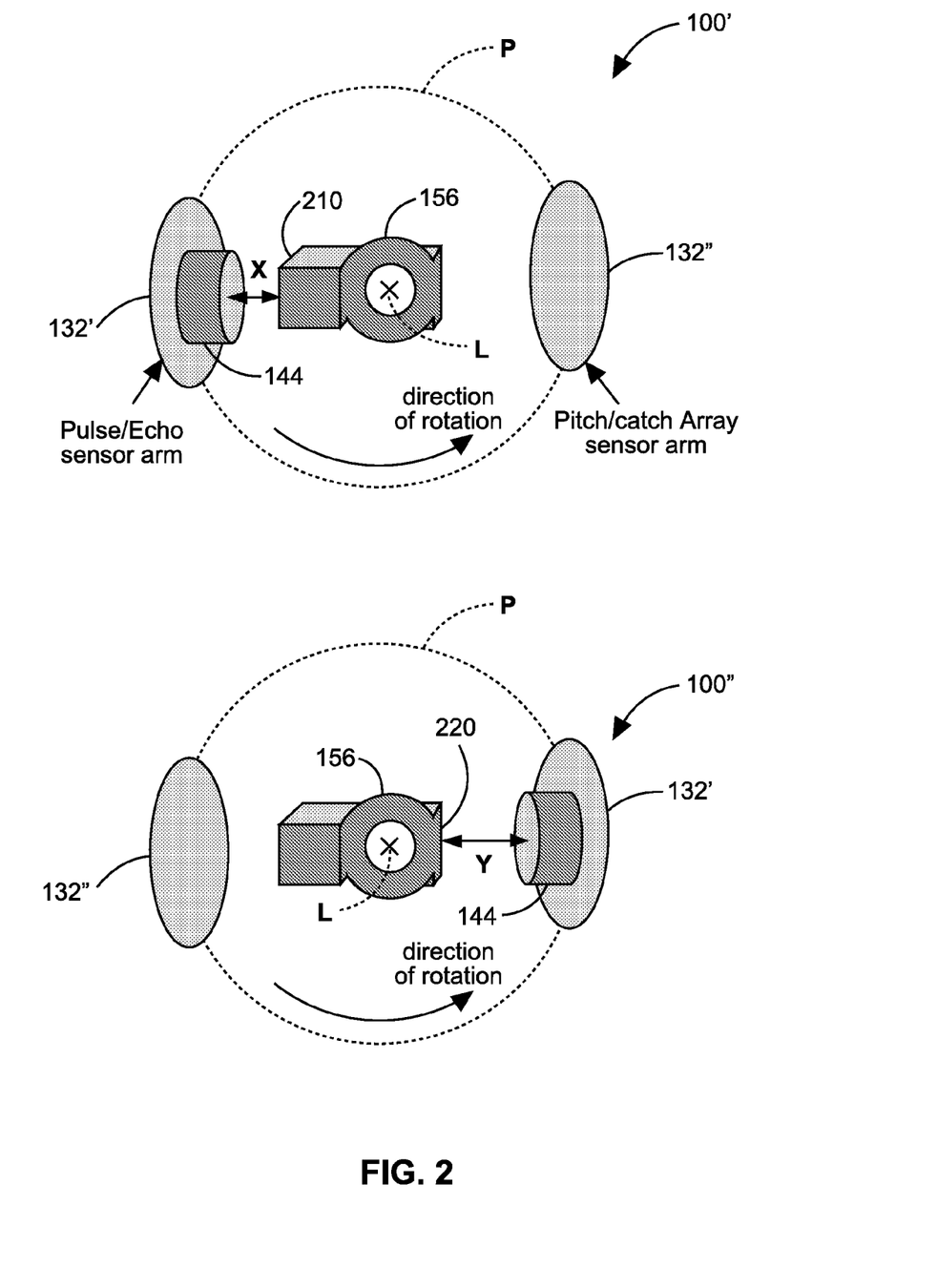
FIG. 2 is a top plan view of an apparatus in two configurations according to various embodiments of the invention.

FIG. 2 is a top plan view of an apparatus 100 in two configurations according to various embodiments of the invention. The first arm 132' (with pulse-echo device 144) and the second arm 132" (with the array 116, not illustrated in this figure) are shown in two positions as characterized by the apparatus 100' in a first configuration, and the apparatus 100" in a second configuration. In the first configuration, the pulse-echo device 144 is substantially opposite a first front surface 210 of the target 156. In the second configuration, the transducer 144 is substantially opposite a second front surface 220 of the target 156, as the mount 124 rotates about the longitudinal axis of the housing 104. With these two configurations of the apparatus 100', 100", the borehole fluid velocity measurement can be made using a first distance X, and a second distance Y that are different from each other. In some embodiments, the target 156 can be positioned off-center from the longitudinal axis of the housing 104, which in the figures is shown to be substantially aligned with the axis of rotation L.

The velocity $V_f$ of an acoustic waveform in the fluid 136 is taken as the average of two velocities—one for each distance, or: $V_f=2(Y-X)/\Delta T$, where $\Delta T$ is the difference in time the wave from the transducer 144 takes to traverse the distance Y, less the time the wave from the transducer 144 takes to traverse the distance X. The fluid velocity $V_f$ can be updated as the head 124 rotates, so that the measured velocity of the fluid 136 can be adjusted when multiple measurements reveal that the velocity $V_f$ has changed. Thus, the transducer 144 is fired at a static reflector target 156 with two different known distance offsets, X and Y. The time difference of the first reflection from the surfaces 210, 220 will therefore determine in situ fluid velocity using two different measurements. Other numbers of measurements are possible, depending on the number of configurations offered by a particular implementation of the apparatus 100.

The pulse-echo device 144 may be fired in the conventional manner, as is well known to those of ordinary skill in the art, for high resolution casing inspection and basic cement evaluation. The pitch/catch array 116 may be fired more or less frequently than the pulse-echo device 144 to reduce the total acquired data volume. Thus, many embodiments may be realized.

For example, referring now to FIGS. 1 and 2, it can be seen that an apparatus 100 may comprise a pulse-echo device 144 in the form of an acoustic transducer attached to a rotatable mount 124 associated with an axis of rotation L, such as the longitudinal axis of the housing 104. With this arrangement, when the pulse-echo device 144 faces toward the axis of rotation L, and is rotated about this axis (see FIG. 2), the pulse-echo device 144 travels along a substantially circular path defining an azimuthal plane P substantially perpendicular to the axis L.

The apparatus 100 may further comprise an acoustic target 156 that provides at least two substantially fixed front surfaces 210, 220 associated with corresponding different acoustic path lengths (X, Y) in the azimuthal plane P, as measured from the face of the pulse-echo device 144 to the front surfaces 210, 220 when the pulse-echo device 144 is rotated about the axis of rotation L.

The pulse-echo device 144 may be attached to an open framework 132 with opposing rotation points. Thus, the rotatable mount 124 may comprise an open, substantially symmetric framework 132 having rotation points R at opposing ends, the rotation points R lying along the axis of rotation L.

The framework 132 may comprise two or more arms connected to the rotation points. Thus, the framework 132 may comprise a pair of arms 132', 132", each of the arms 132', 132" having ends defined by the rotation points. Although not shown, the framework 132 may have multiple pairs of arms 132', 132".

The target 156 may be made of metal or non-metal, with some portion of the target 156 being more or less centralized within the path of rotation. Thus, the target 156 may comprise a non-metallic component located within an area defined by the circular path (e.g., the circular path that defines the azimuthal plane P).

The target 156 may provide multiple surfaces to reflect acoustic waves back to the pulse-echo device 144. In some embodiments, the surfaces are located at various azimuthal locations, such as on opposite sides of the target component, where each of the surfaces faces away from the axis of rotation. Thus, the surfaces 210, 220 may form part of a multi-azimuthal reflection surface facing away from the axis of rotation L. Although only two surfaces 210, 220 are shown for reasons of simplicity, three, four, or more surfaces may be used to provide a more accurate measurement of average fluid velocity near the target 156.

The pulse-echo device 144 used to determine fluid velocity can operate in pulse-echo mode. Thus, the pulse-echo device 144 (e.g., an acoustic transducer) used to determine the fluid velocity may comprise a single transducer to be operated in pulse-echo mode.

Additional transducers, including an array, may be mounted to the same framework 132 as the rotating pulse-echo device 144 that is used to determine the fluid velocity. Thus, the housing 104 may be attached to an array 116 of pitch-catch transducers mounted to a second arm 132" of a framework 132 forming a part of the rotatable mount 124, the pitch-catch transducers facing away from the axis of rotation L.

The array 116 may include multiple transmitters and receivers, wherein the receivers are shared by the transmitters. As shown in FIG. 1, the array 116 comprises two transmitters 148 and five receivers 152. Other combinations of transmitters and receivers are possible.

The pulse-echo device 144 and the array 116 may be mounted on opposite sides of the framework. Thus, the housing 104 may be fashioned so that the pulse-echo device 144 (e.g., an acoustic transducer) is mounted to a first arm 132' of the framework 132, the first arm 132' substantially opposing the second arm 132" with respect to the axis of rotation L.

Yet another device 140, perhaps operating in pulse-echo mode, may be mounted to the rotating framework 132, facing away from the axis of rotation L. Thus, the tool 102 may comprise a pulse-echo device 140 (e.g., an acoustic transducer) mounted to the first arm 132' of the framework 132, the pulse-echo device 140 facing away from the axis of rotation L. The pulse-echo device 140 may comprise a wide band transmitter so that a single transducer can be applied for a wide range of casing sizes. Further embodiments may be realized.

Figure 3:
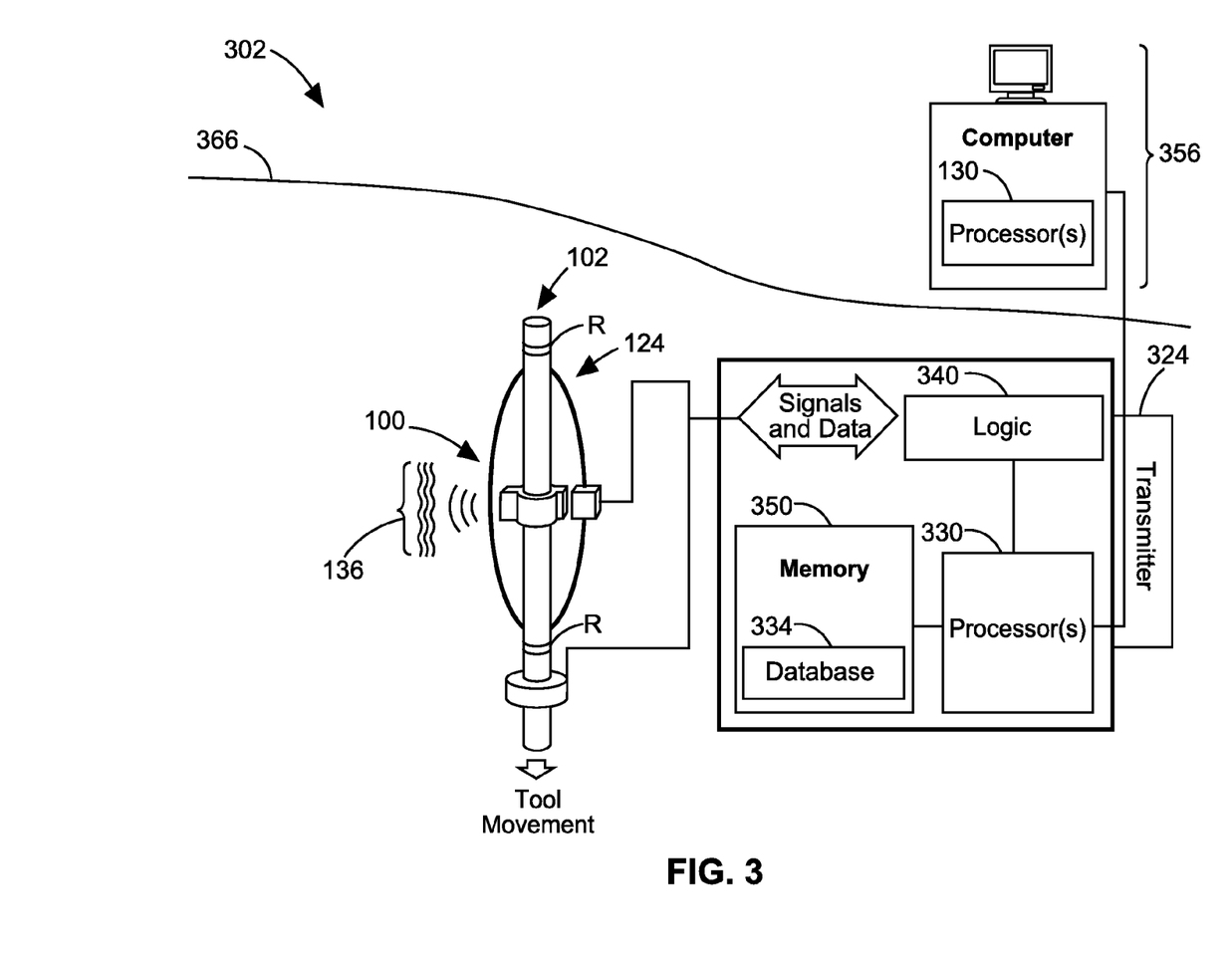
FIG. 3 is a block diagram of apparatus and systems according to various embodiments of the invention.

For example, FIG. 3 is a block diagram of apparatus 100 and system 302 according to various embodiments of the invention. In some embodiments, the system 302 comprises a housing 104 (e.g., a down hole tool housing 104 forming part of the tool 102 shown in FIG. 1) attached to one or more apparatus 100. The system 302 may further comprise one or more processors 330, located inside and/or outside the housing 104, such as a down hole tool, or a wireline tool body. The processors 330 may be configured to process the output values from the apparatus 100, to determine average fluid velocity in the fluid 136.

Other components of the system 302 may include memory 350 and data acquisition logic 340. The memory 350 is communicatively coupled to the processor(s) 330. The processor(s) 330, memory 350, and logic 340 may form part of a data acquisition system, where a database 334 is used to store acquired acoustic waveform data.

A data transmitter 324 may be used to transmit acquired data values and/or processing results to the surface 366. Thus, the system 302 may comprise a data transmitter 324 (e.g., a telemetry transmitter) to transmit acquired data values to a surface workstation 356. Additional embodiments may therefore be realized.

Figure 4:
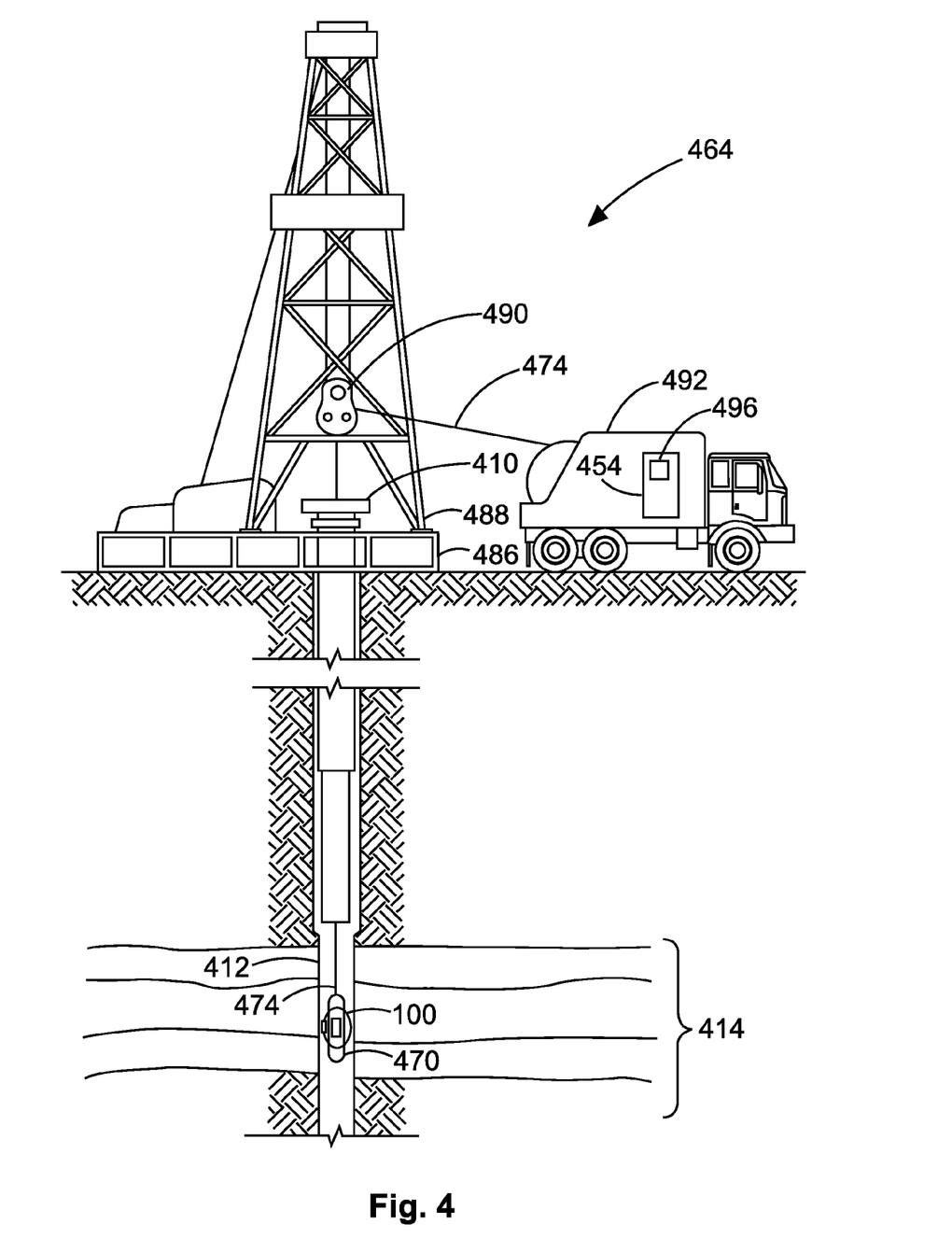
FIG. 4 illustrates a wireline system embodiment of the invention.
Figure 5:
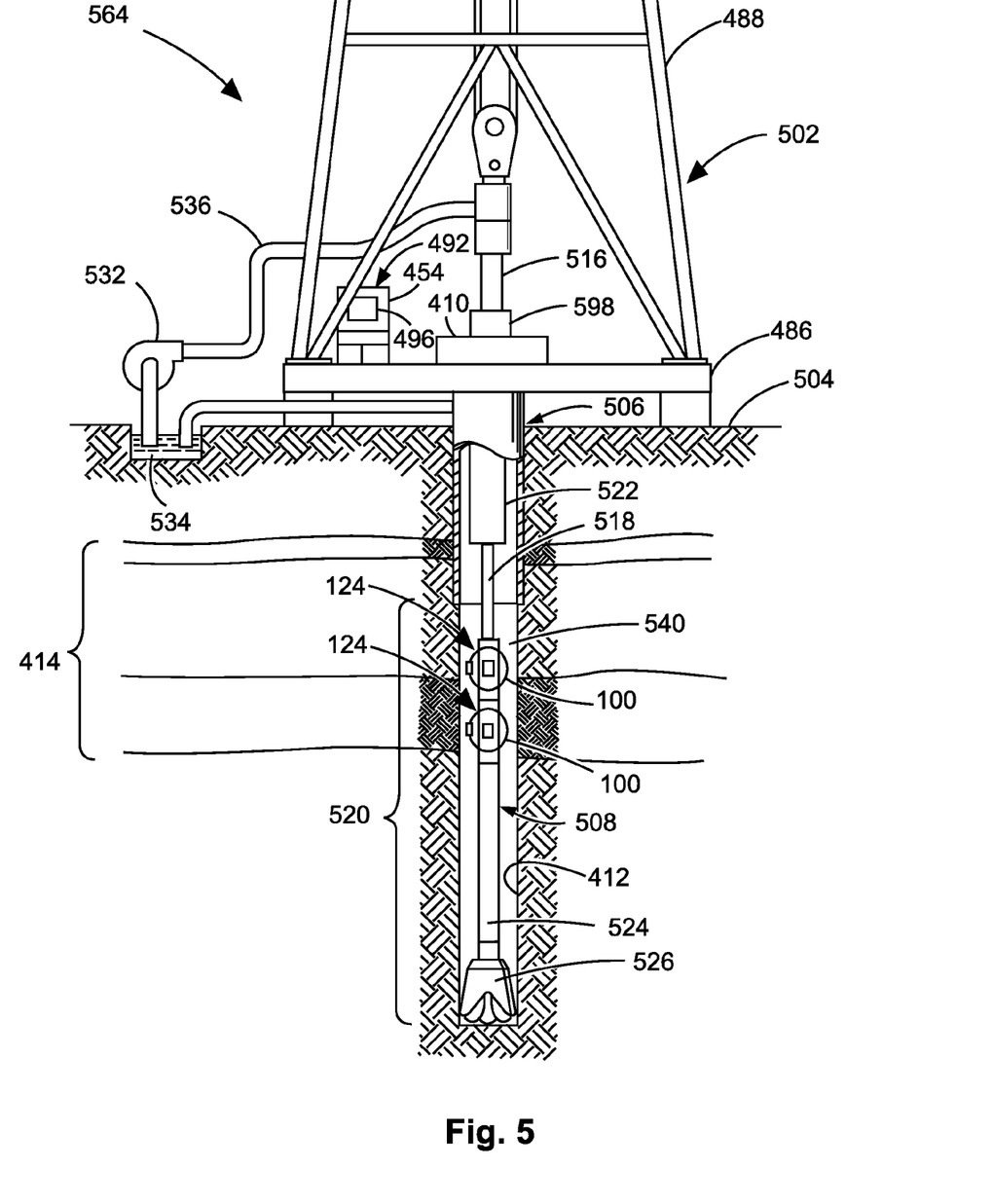
FIG. 5 illustrates a drilling rig system embodiment of the invention.

FIG. 4 illustrates a wireline system 464 embodiment of the invention, and FIG. 5 illustrates a drilling rig system 564 embodiment of the invention. Thus, the systems 464, 564 may comprise portions of a wireline logging tool body 470 as part of a wireline logging operation, or of a down hole tool 524 as part of a down hole drilling operation.

FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths the instruments (e.g., the apparatus 100 of FIGS. 1-2, or system 302 of FIG. 3) included in the tool body 470 may be used to perform measurements within the borehole 412 (e.g. making one or more measurements of the formation 414, cement (not shown), a casing (not shown), or other down hole feature or components). The measurement data can be communicated to a surface logging facility 492 for storage, processing, and analysis. The logging facility 492 may be provided with electronic equipment for various types of signal processing, which may be implemented by any one or more of the components of the apparatus 100 of FIG. 1 or system 302 in FIG. 3. Similar formation evaluation data may be gathered and analyzed during drilling operations (e.g., during LWD (logging while drilling) operations, MWD (measurement while drilling) operations, and by extension, sampling while drilling).

In some embodiments, the tool body 470 comprises an acoustic tool (e.g., tool 102) for obtaining and analyzing acoustic noise measurements from a subterranean formation through a borehole. The tool body 470 is suspended in the wellbore by a wireline cable 474 that connects the tool 102 to a surface control unit (e.g., comprising a workstation 454). The tool body 470 with the tool 102 may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1-5, it may be seen that in some embodiments, the systems 302, 464, 564 may include a drill collar 522, a down hole tool 524, and/or a wireline logging tool body 470 to house or couple to one or more apparatus 100, similar to or identical to the apparatus 100 described above and illustrated in FIGS. 1-2. Components of the system 302 in FIG. 3 may also be housed by the tool 524 or the tool body 470.

Thus, for the purposes of this document, the term "housing" may include any one or more of a drill collar 522, a down hole tool 524, or a wireline logging tool body 470 (all having an outer wall, or end points, to enclose or attach to instrumentation, sensors, fluid sampling devices, pressure measurement devices, transmitters, receivers, acquisition and processing logic, and data acquisition systems). End points on the housing and/or frame may comprise rotation points R, such as those shown in FIG. 1. The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 302, 464, 564 may comprise a housing and one or more apparatus 100 attached to the housing with a rotatable mount associated with an axis of rotation (e.g., the axis L shown in FIG. 1). The apparatus 100 attached to the housing can be constructed and operated as described previously.

The housing can be used in wireline or MWD/LWD applications. Thus, the housing may comprise one of a wireline tool body, a measurement while drilling down hole tool, or a logging while drilling down hole tool. As shown in FIGS. 1, 3, and 5, the rotatable mount 124 can be simultaneously attached to the housing and a drill string.

Centralizers can be used to support the rotatable mount, even if the apparatus is used in a horizontal drilling environment. Thus, the system 302, 464, 564 may comprise a pair of in-line centralizers 128 coupled to a corresponding pair of rotation points R on opposing ends of the rotatable mount 124.

The framework 132 of the rotatable mount 124 can be designed for low-drag operation in drilling mud. For example, the arms 132', 132" of the rotatable mount 124 may have a substantially ovoid cross-section (e.g., see FIG. 2), or a tapering cross-section (e.g., similar to an airfoil or tear drop design that tapers from a larger cross-section to a narrower cross-section in the direction of rotation. Thus, the rotatable mount 124 may comprise arms 132', 132" with a cross-section shaped to provide a drag coefficient in a fluid that is less a circular cross-section.

In some embodiments, a system 302, 464, 564 may include a display 496 to present acoustic waveform information, both measured and processed/calculated, as well as database information, perhaps in graphic form. A system 302, 464, 564 may also include computation logic, perhaps as part of a surface logging facility 492, or a computer workstation 454, to receive signals from transmitters and receivers, and other instrumentation to determine properties of the borehole 412 and the formation 414.

The apparatus 100; tool 102; systems 302, 464, 564; housing 104; casing 108; cement 112; array 116; formation 120; head 124; centralizers 128; framework 132; arms 132', 132"; fluid 136; pulse-echo devices 140, 144; transmitters 148; receivers 152; dual-faced target 156; surfaces 210, 220; transmitter 324; processors 330; data acquisition logic 340; memory 350; workstations 356, 454; rotary table 410; borehole 412; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; and hose 536 may all be characterized as "modules" herein.

Such modules may include hardware circuitry, and/or a processor and/or memory circuits, software program modules and objects, and/or firmware, and combinations thereof, as desired by the architect of the apparatus 100 and systems 302, 464, 564 and as appropriate for particular implementations of various embodiments. For example, in some embodiments, such modules may be included in an apparatus and/or system operation simulation package, such as a signal propagation simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 302, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
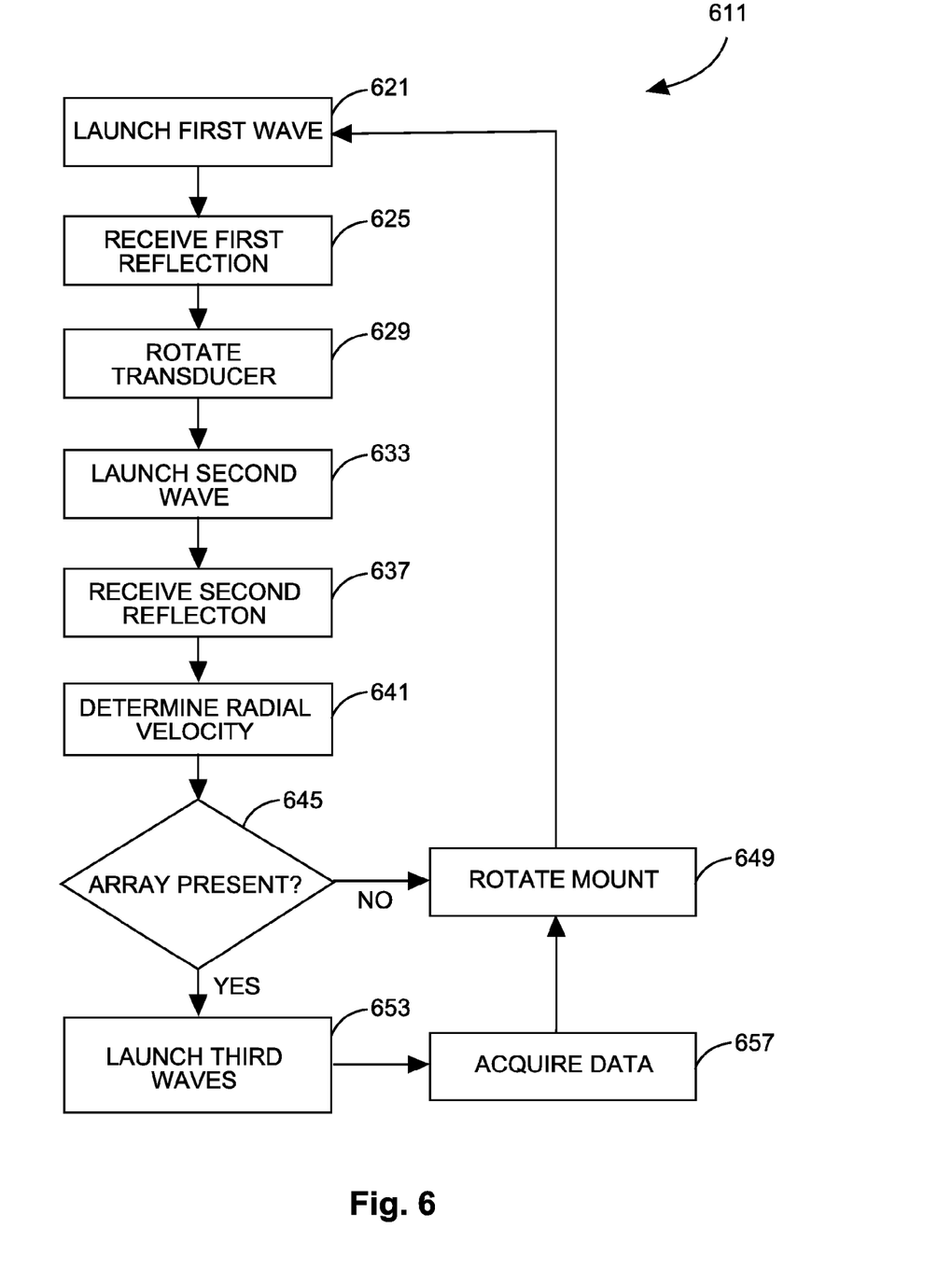
FIG. 6 is a flow chart illustrating several methods according to various embodiments of the invention.

For example, FIG. 6 is a flow chart illustrating several methods 611 according to various embodiments of the invention. In some embodiments, the methods 611 may include launching acoustic waves from a rotating transducer toward the axis of rotation, to be reflected by a common target providing front surface reflections at known, different acoustic path lengths, one or more times per rotation.

Thus, a method 611 may begin at block 621 with launching a first acoustic wave from an acoustic transducer toward an axis of rotation to impinge on a first front surface of a target substantially fixed with respect to the axis.

The method 611 may continue on to block 625 with receiving a reflection of the first acoustic wave from the first front surface at the acoustic transducer.

The method 611 may go on to include, at block 629, rotating the acoustic transducer about the axis along a substantially circular path defining an azimuthal plane.

The acquisition of acoustic wave travel time data can include rotating an in-line framework. Thus, the activity at block 629 may comprise rotating a rotatable mount coupled in-line to a drill string at opposing rotatable ends, where the longitudinal axis of the drill string defines the axis of rotation.

A multitude of transducers can be rotated at the same time as the primary, fluid travel time determination (pulse-echo) transducer. Thus, the activity at block 629 may comprise substantially simultaneously rotating the acoustic transducer and an array of pitch-catch transducers facing away from the axis.

The method 611 may continue on to block 633 with launching a second acoustic wave from the acoustic transducer toward the axis of rotation to impinge on a second front surface of the target.

The method 611 may go on to include, at block 637, receiving a reflection of the second acoustic wave from the second front surface at the acoustic transducer, wherein an acoustic path length of the first acoustic wave in the azimuthal plane is different from an acoustic path length of the second acoustic wave in the azimuthal plane. Additional embodiments may be realized.

For example, the velocity of sound in fluid can be found by averaging the acoustic wave travel times along the different path lengths. Thus, the method 611 may include, at block 641, determining the radial velocity of sound in a fluid (e.g., formation fluid or drilling mud, or a combination of these) based on an average of travel time along the acoustic path lengths of the first and second acoustic waves in the fluid.

The method 611 may continue on to block 645, to determine whether an array of transducers (e.g., a pitch/catch array) is present. If so, the array of transducers may be used to image the casing, with casing distance and other environmental characteristics determined in part by the fluid velocity attributed to the primary transducer and its target. Thus, the method 611 may include, at block 653, launching third acoustic waves from two transmitters in an array of pitch-catch transducers, for reception by a common group of receivers in the array, after rotating the array and the acoustic transducer attached to opposing sides of a rotatable mount.

In some embodiments, the first and second acoustic waves are launched once per revolution—so that the pulse-echo device 144 fires twice per revolution. Other pulse-echo device 140 (e.g., to measure distance to the casing from the framework, casing thickness and impedance of the material behind casing) and a pitch-catch array may be fired at about the same time, or at different times, depending on the resolution desired. For example, in a 15 cm inside diameter casing, with 6 mm imaging resolution, the pulse-echo device that launches the first and second acoustic waves may fire twice per revolution, while the pitch-catch array and another pulse-echo device (to measure distance to the casing) may fire between 70-80 times during the same revolution.

If no array is present, as determined at block 645, the method 611 may continue directly on to block 649, with rotating the transducer mounting frame so as to be in position for launching another acoustic wave at block 621.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
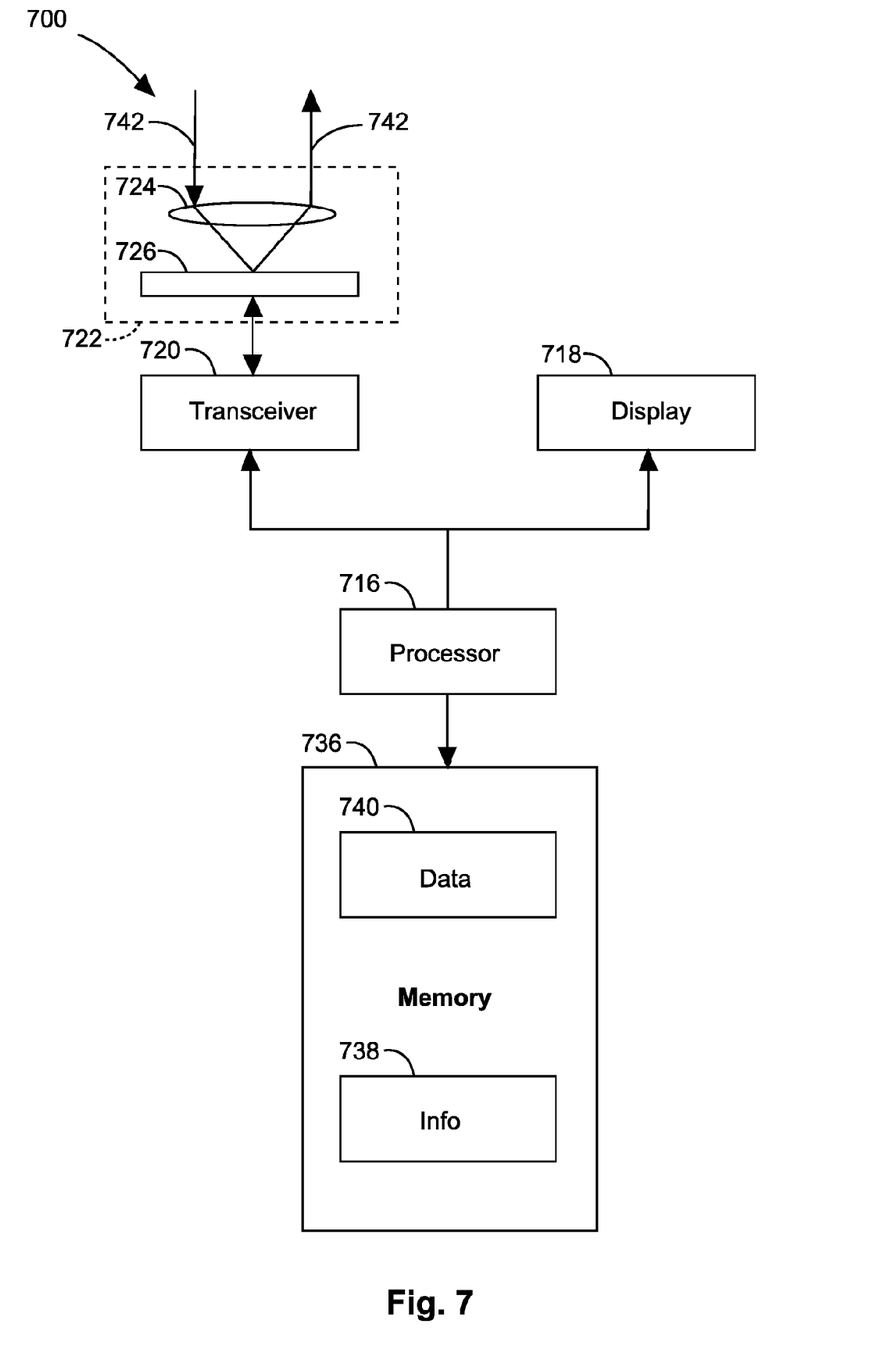
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIG. 6, the apparatus of FIGS. 1 and 2, and the systems of FIGS. 3, 4, and 5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 and housing 104 shown in FIGS. 1 and 2. In some embodiments, the article 700 is similar to or identical to the apparatus 100 or system 302 shown in FIGS. 1-3.

In summary, using the apparatus, systems, and methods disclosed herein may provide a new in-situ fluid velocity measurement concept. The pitch/catch transducer array may serve to reduce direct reflection and reverberation signals, to permit better images behind the casing. Simultaneous measurements of pulse-echo and pitch/catch transducers can be used to enhance confidence in the behind-casing tool response. In addition, using an in-line rotational head allows placement of the velocity measurement tool (and/or casing imaging tool) at any location within the tool string—not just at the bottom of the string, which permits building larger arrays, if desired. A combination of these advantages can significantly enhance the value of the services provided by an operation/exploration company, while at the same time controlling time-related costs. Greater customer satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
an acoustic transducer attached to a rotatable mount associated with an axis of rotation such that, when the transducer faces toward the axis and is rotated about the axis, the transducer travels along a substantially circular path defining an azimuthal plane substantially perpendicular to the axis; and
an acoustic target, the target providing at least two substantially fixed front surfaces associated with corresponding different, direct reflection acoustic path lengths in the azimuthal plane from the acoustic transducer to the acoustic target and directly back to the acoustic transducer, as measured from a face of the transducer to each front surface when the transducer is rotated about the axis to a position of direct reflection for each front surface, the acoustic target arranged with the acoustic transducer to operatively determine a property of a fluid disposed between the acoustic target and the acoustic transducer.

2. The apparatus of claim 1, wherein the rotatable mount comprises:
an open, substantially symmetric framework having rotation points at opposing ends, the rotation points lying along the axis.

3. The apparatus of claim 2, wherein the framework comprises a pair of arms, each of the arms having ends defined by the rotation points.

4. The apparatus of claim 1, wherein the target comprises:
a non-metallic component located within an area defined by the circular path.

5. The apparatus of claim 4, wherein the surfaces form part of a multi-azimuthal reflection surface facing away from the axis.

6. The apparatus of claim 1, wherein the acoustic transducer is a single transducer to be operated in pulse-echo mode.

7. The apparatus of claim 1, further comprising:
an array of pitch-catch transducers mounted to a second arm of a framework forming a part of the rotatable mount, the pitch-catch transducers facing away from the axis.

8. The apparatus of claim 7, wherein the array comprises two transmitters and five receivers.

9. The apparatus of claim 7, wherein the acoustic transducer is mounted to a first arm of the framework, the first arm substantially opposing the second arm with respect to the axis.

10. The apparatus of claim 9, further comprising:
a second acoustic transducer mounted to the first arm of the framework, the second acoustic transducer facing away from the axis.

11. A system, comprising:
a housing; and an apparatus attached to the housing with a rotatable mount associated with an axis of rotation, the apparatus comprising an acoustic transducer attached to the rotatable mount such that, when the acoustic transducer faces toward the axis and is rotated about the axis, the acoustic transducer travels along a substantially circular path defining an azimuthal plane substantially perpendicular to the axis, and an acoustic target, the target providing at least two substantially fixed front surfaces associated with corresponding different, direct reflection acoustic path lengths in the azimuthal plane from the acoustic transducer to the acoustic target and directly back to the acoustic transducer, as measured from a face of the acoustic transducer to the front surfaces when the acoustic transducer is rotated about the axis to a position of direct reflection for each front surface, the acoustic target arranged with the acoustic transducer to operatively determine a property of a fluid disposed between the acoustic target and the acoustic transducer.

12. The system of claim 11, wherein the housing comprises:
one of a wireline tool body, a measurement while drilling down hole tool, or a logging while drilling down hole tool.

13. The system of claim 11, wherein the rotatable mount is also attached to a drill string.

14. The system of claim 11, further comprising:
a pair of in-line centralizers coupled to a corresponding pair of rotation points on opposing ends of the rotatable mount.

15. The system of claim 11, wherein the rotatable mount has arms with a cross-section shaped to provide a drag coefficient in a fluid that is less a circular cross-section.

16. A processor-implemented method, comprising:
launching a first acoustic wave from an acoustic transducer toward an axis of rotation to impinge on a first front surface of a target substantially fixed with respect to the axis;
receiving a direct reflection of the first acoustic wave from the first front surface at the acoustic transducer, the direct reflection of the first acoustic wave being from the acoustic transducer to the first front surface and directly back to the acoustic transducer;
rotating the acoustic transducer about the axis along a substantially circular path defining an azimuthal plane;
launching a second acoustic wave from the acoustic transducer toward the axis of rotation to impinge on a second front surface of the target; and
receiving a direct reflection of the second acoustic wave from the second front surface at the acoustic transducer, the direct reflection of the second acoustic wave being from the acoustic transducer to the second front surface and directly back to the acoustic transducer, wherein an acoustic path length of the first acoustic wave in the azimuthal plane is different from an acoustic path length of the second acoustic wave in the azimuthal plane, as measured from a face of the acoustic transducer to each of the first and second front surfaces when the acoustic transducer is rotated about the axis to a position of direct reflection for each of the first and second front surfaces, the target arranged with the acoustic transducer to operatively determine a property of fluid disposed between the target and the acoustic transducer.

17. The method of claim 16, further comprising:
determining velocity of sound in a fluid based on a difference of travel time along the acoustic path lengths of the first and the second acoustic waves in the fluid.

18. The method of claim 16, wherein the rotating comprises:
rotating a rotatable mount coupled in-line to a drill string at opposing rotatable ends, a longitudinal axis of the drill string defining the axis of rotation.

19. The method of claim 16, wherein the rotating comprises:
substantially simultaneously rotating the acoustic transducer and an array of pitch-catch transducers facing away from the axis.

20. The method of claim 19, further comprising:
launching third acoustic waves from two transmitters in an array of pitch-catch transducers, for reception by a common group of receivers in the array, after rotating the array and the acoustic transducer attached to opposing sides of a rotatable mount.

* * * * *